United States Patent [19]

Matyas et al.

[11] Patent Number: 5,073,934
[45] Date of Patent: Dec. 17, 1991

[54] METHOD AND APPARATUS FOR CONTROLLING THE USE OF A PUBLIC KEY, BASED ON THE LEVEL OF IMPORT INTEGRITY FOR THE KEY

[75] Inventors: Stephen M. Matyas; Donald B. Johnson; An V. Le, all of Manassas, Va.; William C. Martin, Concord, N.C.; Rostislaw Prymak, Dumfries, Va.; William S. Rohland, Charlotte, N.C.; John D. Wilkins, Somerville, Va.

[73] Assignee: International Business Machines Corporation, Armonk, N.Y.

[21] Appl. No.: 602,989

[22] Filed: Oct. 24, 1990

[51] Int. Cl.$^5$ .............................................. H04L 9/30
[52] U.S. Cl. ....................................... 380/30; 380/25; 380/45; 380/49
[58] Field of Search .................. 364/200, 900; 380/20, 380/21, 23, 25, 30, 43, 45, 47, 49, 50

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,405,829 | 9/1983 | Rivest et al. | 380/30 |
| 4,850,017 | 7/1989 | Matyas, Jr. et al. | 380/21 |
| 4,908,861 | 3/1990 | Brachtl et al. | 380/25 |
| 4,918,728 | 4/1990 | Matyas et al. | 380/21 |
| 4,924,514 | 5/1990 | Matyas et al. | 380/24 |
| 4,924,515 | 5/1990 | Matyas et al. | 380/25 |
| 4,941,176 | 7/1990 | Matyas et al. | 380/21 |

OTHER PUBLICATIONS

R. W. Jones, "Some Techniques for Handling Encipherment Keys", ICL Technical Journal, Nov. 1982, pp. 175-188.

D. W. Davies & W. L. Price, "Security for Computer Networks", John Wiley & Sons, NY, 1984, Sec. 6.5, Key Management with Tagged Keys, pp. 168-172.

W. Diffie, et al., "Privacy and Authentication: An Introduction to Ctyptography", Proc. of IEEE, vol. 67, No. 3, 3/79, pp. 397-427.

Primary Examiner—Bernarr E. Gregory
Attorney, Agent, or Firm—John E. Hoel

[57] ABSTRACT

A method and apparatus in a public crypto system, control the use of a public key, based on the level of import integrity for the public key. The method and apparatus generate a control vector associated with the public key, having a history field. The public key and the control vector are transmitted from the location of generation over a communications link to a receiving location, using the selected one of a plurality of levels of import integrity for the transmission. At the receiving location, the public key and the control vector are tested to determine the actual level of import integrity for the transmission. Then, a value is written into the history field of the control vector which characterizes the actual level of import integrity. Thereafter, cryptographic applications for the public key are limited by control vector checking, to only those applications which have a required level of integrity which is not greater than the actual level of import integrity characterized by the history field in the control vector.

30 Claims, 8 Drawing Sheets

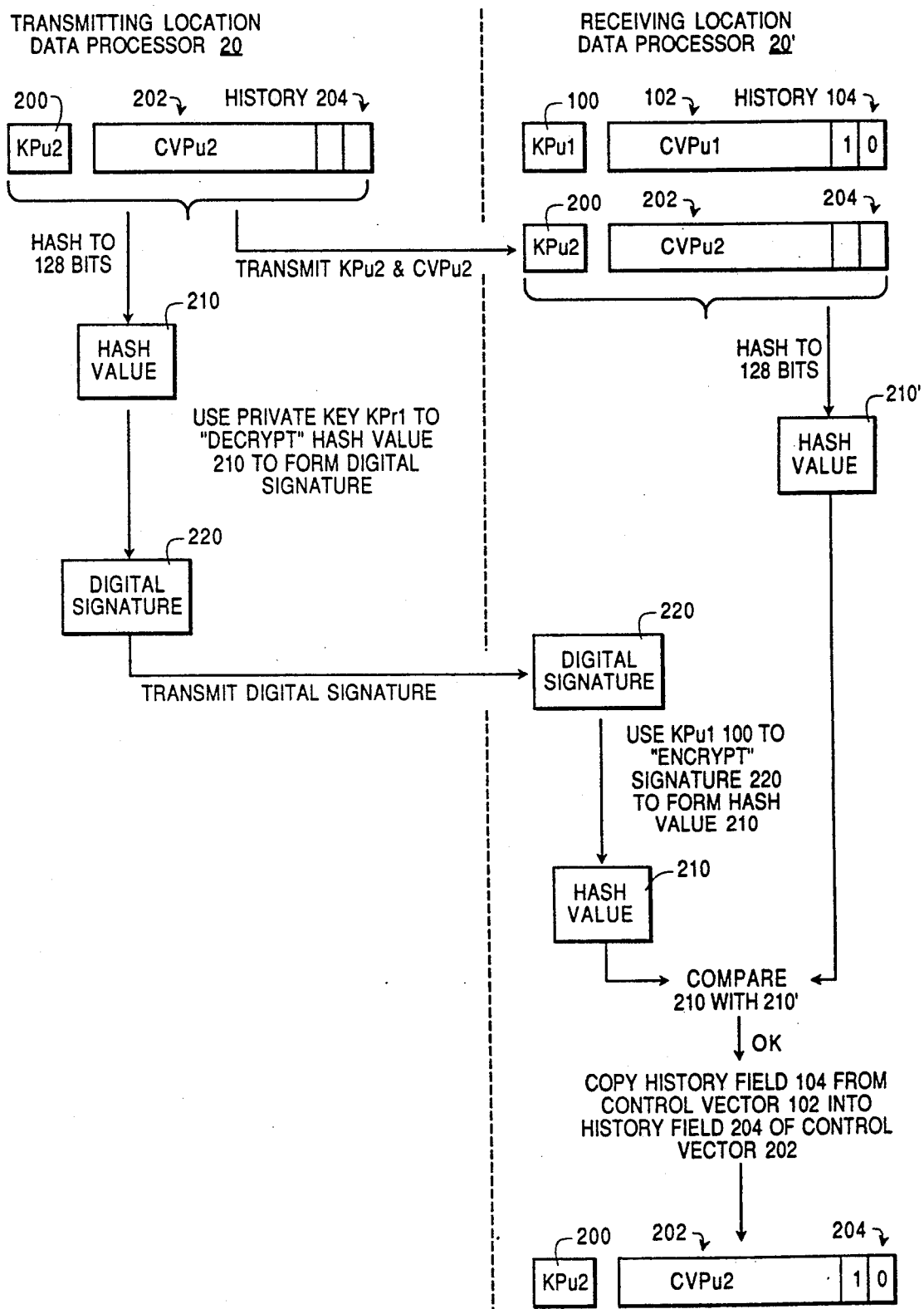

METHOD AND APPARATUS FOR CONTROLLING THE USE OF A PUBLIC KEY, BASED ON THE LEVEL OF IMPORT INTEGRITY FOR THE KEY

BACKGROUND OF THE INVENTION

1. Technical Field

The invention disclosed broadly relates to data processing technology and more particularly relates to cryptographic applications in data processing.

2. Background Art

The following patents and copending patent applications are related to this invention and are incorporated herein by reference:

B. Brachtl, et al., "Controlled Use of Cryptographic Keys Via Generating Stations Established Control Values," U.S. Pat. No. 4,850,017, issued July 18, 1989, assigned to IBM Corporation, and incorporated herein by reference.

S. M. Matyas, et al., "Secure Management of Keys Using Control Vectors," U.S. Pat. No. 4,941,176, issued July 10, 1990, assigned to IBM Corporation and incorporated herein by reference.

S. M. Matyas, et al., "Data Cryptography Operations Using Control Vectors," U.S. Pat. No. 4,918,728, issued Apr. 17, 1990, assigned to IBM Corporation, and incorporated herein by reference.

S. M. Matyas, et al., "Personal Identification Number Processing Using Control Vectors," U.S. Pat. No. 4,924,514, issued May 8, 1990, assigned to IBM Corporation and incorporated herein by reference.

S. M. Matyas, et al., "Secure Management of Keys Using Extended Control Vectors," U.S. Pat. No. 4,924,515, issued May 8, 1990, assigned to IBM Corporation and incorporated herein by reference.

B. Brachtl, et al., "Data Authentication Using Modification Detection Codes Based on a Public One Way Encryption Function," U.S. Pat. No. 4,908,861, issued Mar. 13, 1990, assigned to IBM Corporation and incorporated herein by reference.

D. Abraham, et al., "Smart Card Having External Programming Capability and Method of Making Same," Ser. No. 004,501, filed Jan. 19, 1987, assigned to IBM Corporation, and incorporated herein by reference.

The cryptographic architecture described in the cited patents by S. M. Matyas, et al. is based on associating with a cryptography key, a control vector which provides the authorization for the uses of the key intended by the originator of the key. Various key management functions, data cryptography functions, and other data processing functions are possible using control vectors, in accordance with the invention. A system administrator can exercise flexibility in the implementation of his security policy by selecting appropriate control vectors in accordance with the invention. A cryptographic facility (CF) in the cryptographic architecture is described in the above cited patents by S. M. Matyas, et al. The CF is an instruction processor for a set of cryptographic instructions, implementing encryption methods and key generation methods. A memory in the crypto facility stores a set of internal cryptographic variables. Each cryptographic instruction is described in terms of a sequence of processing steps required to transform a set of input parameters to a set of output parameters. A cryptographic facility application program is also described in the referenced patents and patent applications, which defines an invocation method, as a calling sequence, for each cryptographic instruction consisting of an instruction mnemonic and an address with corresponding input and output parameters.

Public key encryption algorithms are described in a paper by W. Diffie and M. E. Hellman entitled "Privacy and Authentication: An Introduction to Cryptography," *Proceedings of the IEEE*, Vol. 67, No. 3, March 1979, pp. 397–427. Public key systems are based on dispensing with the secret key distribution channel, as long as the channel has a sufficient level of integrity. In a public key crypto system, two keys are used, one for enciphering and one for deciphering. Public key algorithm systems are designed so that it is easy to generate a random pair of inverse keys Pu for enciphering and Pr for deciphering and it is easy to operate with Pu and Pr, but is computationally infeasible to compute Pr from Pu. Each user generates a pair of inverse transforms, Pu and Pr. He keeps the deciphering transformation Pr secret, and makes the enciphering transformation Pu public by placing it in a public directory. Anyone can now encrypt messages and send them to the user, but no one else can decipher messages intended for him. It is possible, and often desirable, to encipher with Pr and decipher with Pu. For this reason, Pu is usually referred to as a public key and Pr is usually referred to as a private key. A corollary feature of public key crypto systems is the provision of a digital signature which uniquely identifies the sender of a message. If user A wishes to send a signed message M to user B, he operates on it with his private key Pr to produce the signed message S. Pr was used as A's deciphering key when privacy was desired, but it is now used as his "enciphering" key. When user B receives the message S, he can recover the message M by operating on the ciphertext S with A's public Pu. By successfully decrypting A's message, the receiver B has conclusive proof it came from the sender A. Examples of public key cryptography are provided in the following U.S. patents: U.S. Pat. No. 4,218,582 to Hellman, et al., "Public Key Cryptographic Apparatus and Method;" U.S. Pat. No. 4,200,770 to Hellman, et al., "Cryptographic Apparatus and Method;" and U.S. Pat. No. 4,405,829 to Rivest, et al., "Cryptographic Communications System and Method."

The problem in the prior art of public key crypto systems is in the distribution of public keys from a sender to one or more receivers. If an eavesdropper substitutes his own public key for the sender's public key, and retains his own corresponding private key which corresponds to the substituted public key sent to the receiver, then the eavesdropper can transmit bogus messages to the receiver and the receiver has no way of determining that the messages do not in fact come from the original sender. The term "data integrity" is used to describe the degree to which a data unit received by a receiver, can be relied upon as being identical to a data unit sent by the sender, to whom the received data unit is attributed.

OBJECTS OF THE INVENTION

It is therefore an object of the invention to provide an improved method for distributing public keys in a public key crypto system.

It is a further object of the invention to control the use of a public key, based upon its level of data import integrity.

SUMMARY OF THE INVENTION

These and other objects, features and advantages are accomplished by the invention disclosed herein. A method and apparatus are disclosed for controlling the use of a public key, based on the level of import integrity for the public key. The method and apparatus find application in a public key crypto system which includes a pair of cryptographic devices communicating using a public key algorithm. The method begins with generating at the first cryptographic device, a public key and a private key. Then, a control vector is generated at the first device which is associated with the public key, the control vector having a history field. Thereafter, the public key and its control vector are transmitted from the first device over communications link to a second cryptographic device, using a selective one of a plurality of levels of import integrity for the transmission. Then, at the second device, the public key and the control vector are tested to determine the actual level of import integrity. Then, the second device writes a value into the history field of the control vector which characterizes the actual level of import integrity. Thereafter, the second device will limit the cryptographic applications for the public key by control vector checking, to only those applications which require a level of integrity which is not greater than the actual level of import integrity characterized by the history field in the control vector.

BRIEF DESCRIPTION OF THE DRAWINGS

These and other objects, features and advantages of the invention will be more fully appreciated with reference to the accompanying figures.

FIG. 10 is a data flow diagram illustrating the propagation of the integrity attribution in the history field for chained public keys.

DESCRIPTION OF THE BEST MODE FOR CARRYING OUT THE INVENTION

Figure 1:
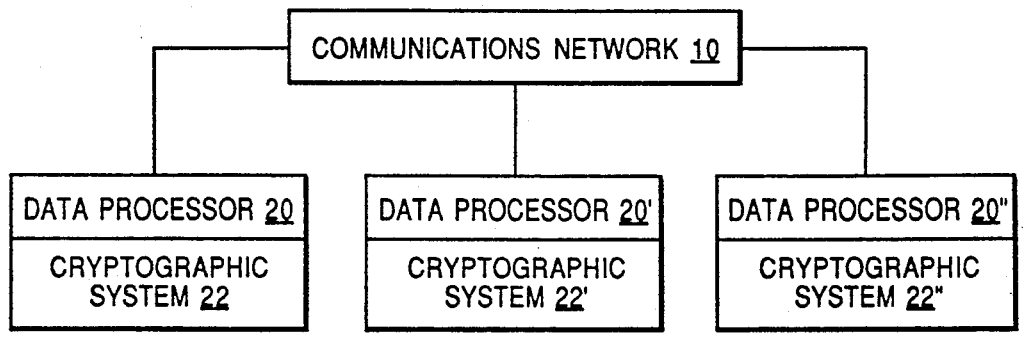
FIG. 1 illustrates a communications network 10 including a plurality of data processors, each of which includes a cryptographic system.

FIG. 1 illustrates a network block diagram showing a communications network 10 to which is connected a plurality of data processors including data processor 20, data processor 20', and data processor 20". Also included in each data processor is a cryptographic system, as shown in FIG. 1. Data processor 20 includes cryptographic system 22, data processor 20' includes cryptographic system 22' and data processor 20" includes cryptographic system 22". Each data processor supports the processing of one or more applications which require access to cryptographic services such as for the encryption, decryption and authenticating of application data and the generation and installation of cryptographic keys. The cryptographic services are provided by a secure cryptographic facility in each cryptographic system. The network provides the means for the data processors to send and receive encrypted data and keys. Various protocols, that is formats and procedural rules, govern the exchange of cryptographic quantities between communicating data processors in order to ensure the interoperability between them.

Figure 2:
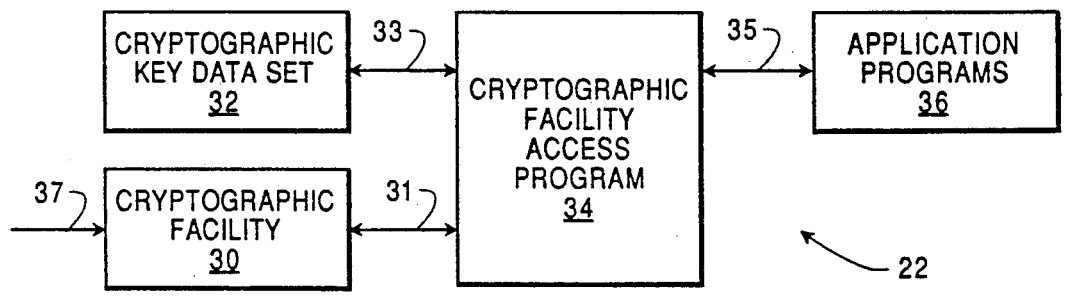
FIG. 2 is a block diagram of a cryptographic system 22.

FIG. 2 illustrates the cryptographic system 22. In the cryptographic system 22, the cryptographic facility (CF) 30 has an input 37 from a physical interface. The cryptographic facility access program (CFAP) 34 is coupled to the cryptographic facility 30 by means of the interface 31. The cryptographic key data set (CKDS) 32 is connected to the cryptographic facility access program 34 by means of the interface 33. The application programs (APPL) 36 are connected to the cryptographic facility access program 34 by means of the interface 35.

A typical request for cryptographic service is initiated by APPL 36 via a function call to the CFAP 34 at the interface 35. The service request includes key and data parameters, as well as key identifiers which the CFAP 34 uses to access encrypted keys from the CKDS 32 at the interface 33. The CFAP 34 processes the service request by issuing one or more cryptographic access instructions to the CF 30 at the interface 31. The CF 30 may also have an optional physical interface 37 for direct entry of cryptographic variables into the CF 30. Each cryptographic access instruction invoked at the interface 31 has a set of input parameters processed by the CF 30 to produce a set of output parameters returned by the CF 30 to the CFAP 34. In turn, the CFAP 34 may return output parameters to the APPL 36. The CFAP 34 may also use the output parameters and input parameters to subsequently invoke instructions. If the output parameters contain encrypted keys, then the CFAP 34, in many cases, may store these encrypted keys in the CKDS 32.

Figure 3:
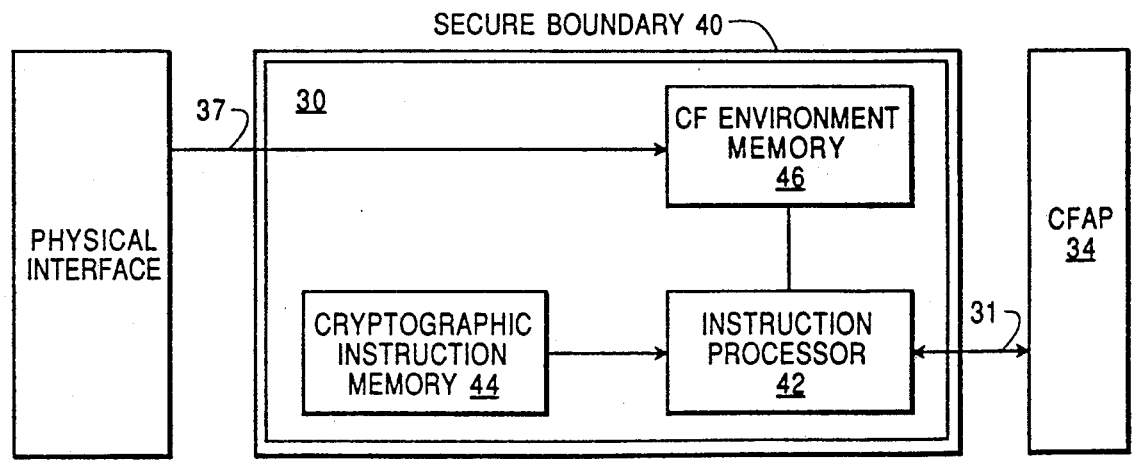
FIG. 3 is a block diagram of a cryptographic facility 30.

FIG. 3 illustrates the cryptographic facility 30. The cryptographic facility 30 is maintained within a secure boundary 40. The cryptographic facility 30 includes the instruction processor 42 which is coupled to the cryptographic algorithms 44 which are embodied as executable code. The cryptographic facility environment memory 46 is coupled to the instruction processor 42. The physical interface can be coupled over line 37 to the CF environment memory 46, as shown in the figure. The instruction processor 42 is coupled to the cryptographic facility access program (CFAP) 34 by means of the interface at 31.

The instruction processor 42 is a functional element which executes cryptographic microinstructions invoked by the CFAP access instruction at the interface 31. For each access instruction, the interface 31 first defines an instruction mnemonic or operation code used to select particular microinstructions for execution. Secondly a set of input parameters is passed from the CFAP 34 to the CF 30. Thirdly, a set of output parameters is returned by the CF 30 to the CFAP 34. The instruction processor 42 executes the selected instruction by performing an instruction specific sequence of cryptographic processing steps embodied as microinstructions stored in cryptographic microinstruction memory 44. The control flow and subsequent output of the cryptographic processing steps depend on the values of the input parameters and the contents of the CF environment memory 46. The CF environment memory 46 consists of a set of cryptographic variables, for example keys, flags, counters, CF configuration data, etc., which are collectively stored within the CF 30. The CF environment variables in memory 46 are initialized via the interface 31, that is by execution of certain CF microinstructions which read input parameters and load them into the CF environment memory 46. Alternately, initialization can be done via an optional physical interface which permits cryptovariables to be loaded directly into the CF environment memory 46, for example via an attached key entry device.

The physical embodiment of the cryptographic facility secure boundary 40, incorporates the following physical security features. The physical embodiment resists probing by an insider adversary who has limited access to the cryptographic facility 30. The term "limited" is measured in minutes or hours as opposed to days or weeks. The adversary is constrained to a probing attack at the customer's site using limited electronic devices as opposed to a laboratory attack launched at a site under the control of the adversary using sophisticated electronic and mechanical equipment. The physical embodiment also detects attempts at physical probing or intruding, through the use of a variety of electromechanical sensing devices. Also, the physical embodiment of the cryptographic facility 30 provides for the zeroization of all internally stored secret cryptovariables. Such zeroization is done automatically whenever an attempted probing or intrusion has been detected. The physical embodiment also provides a manual facility for a zeroization of internally stored secret cryptovariables. Reference to the Abraham, et al. patent application cited above, will give an example of how such physical security features can be implemented.

Figure 4A:
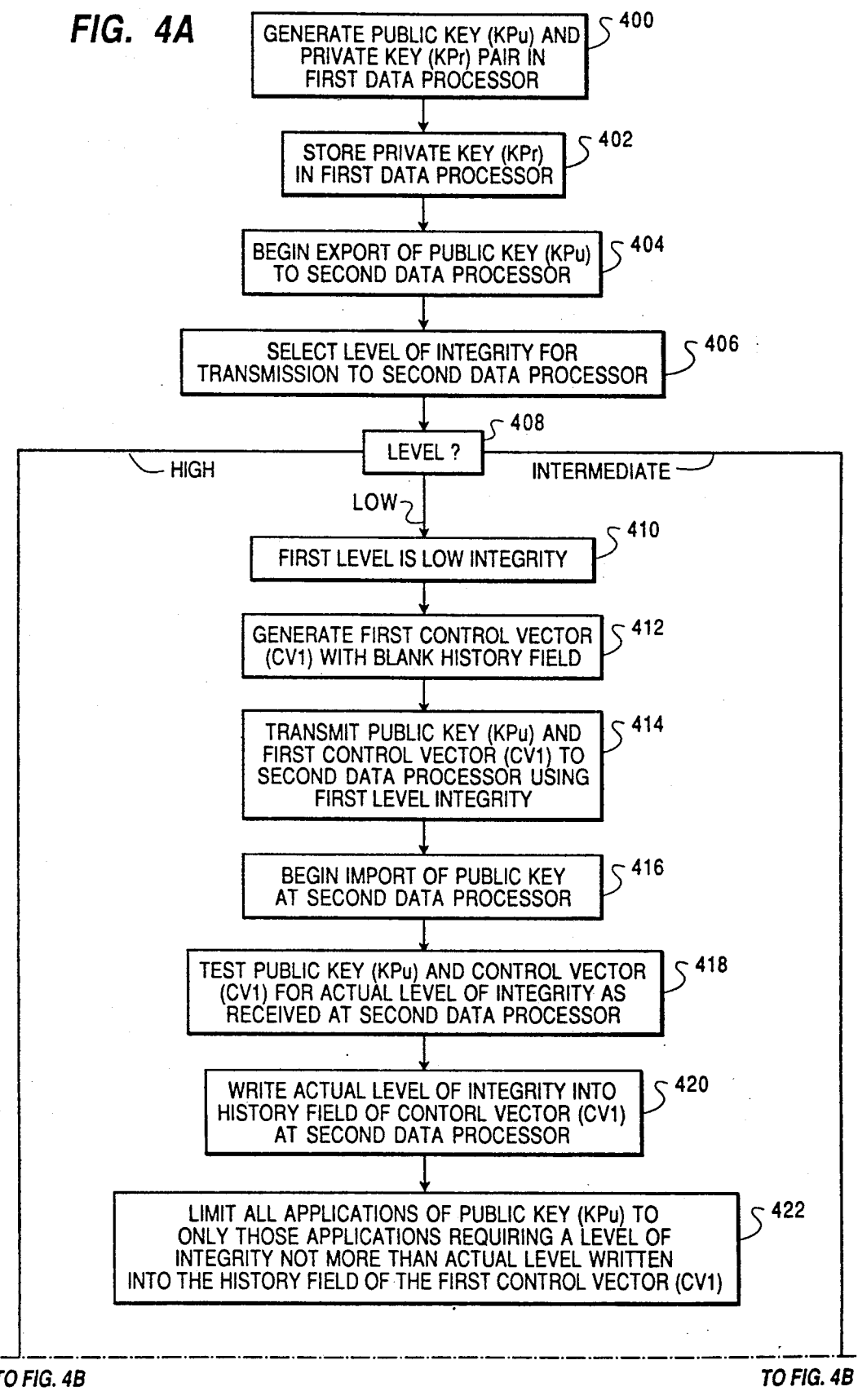
FIG. 4 (i.e. 4A and 4B) is a flow diagram of the method to control the use of an exported public key based on its actual level of integrity, as imported at the receiving data processor.
Figure 4B:
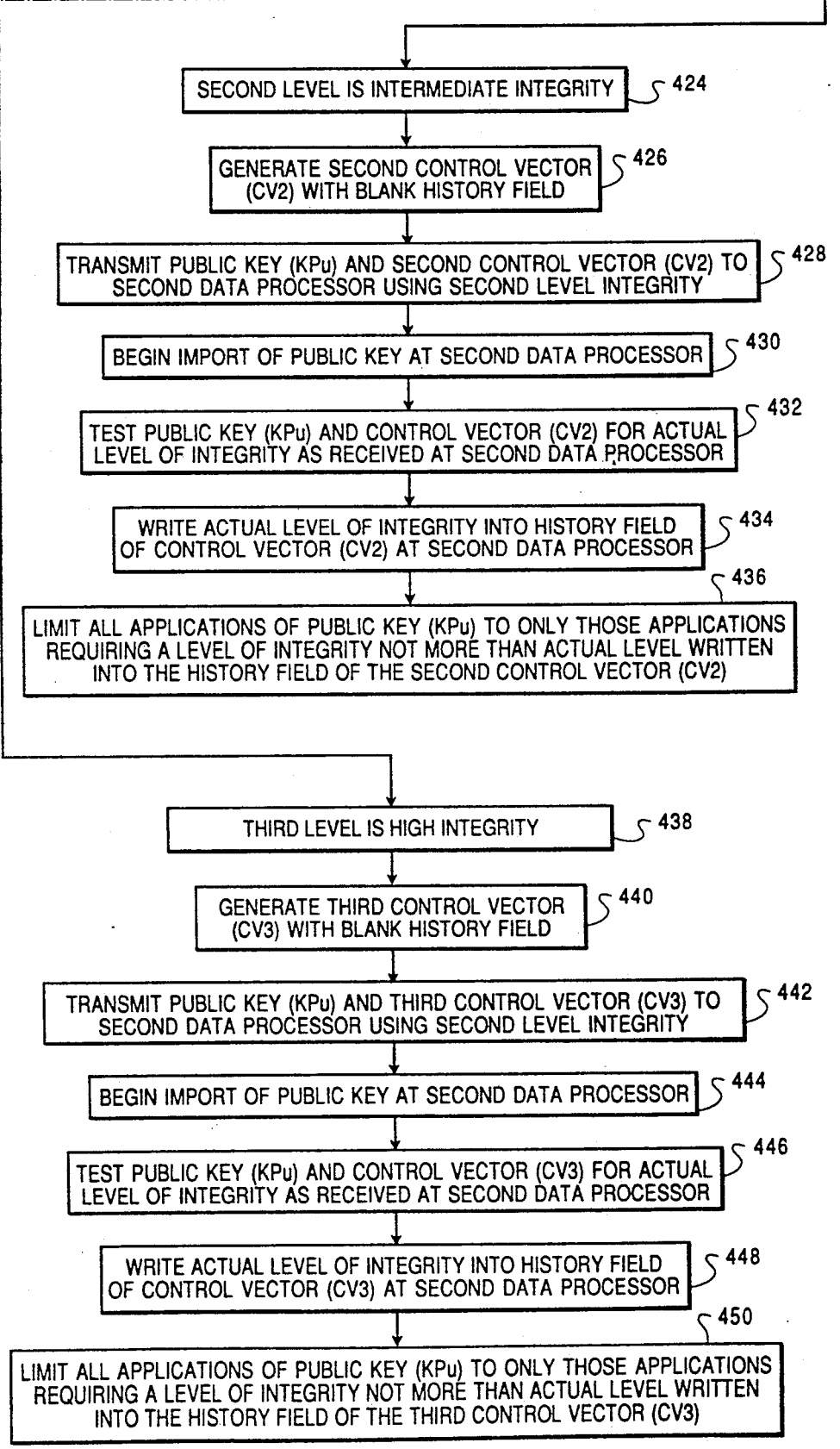
Figure 5:
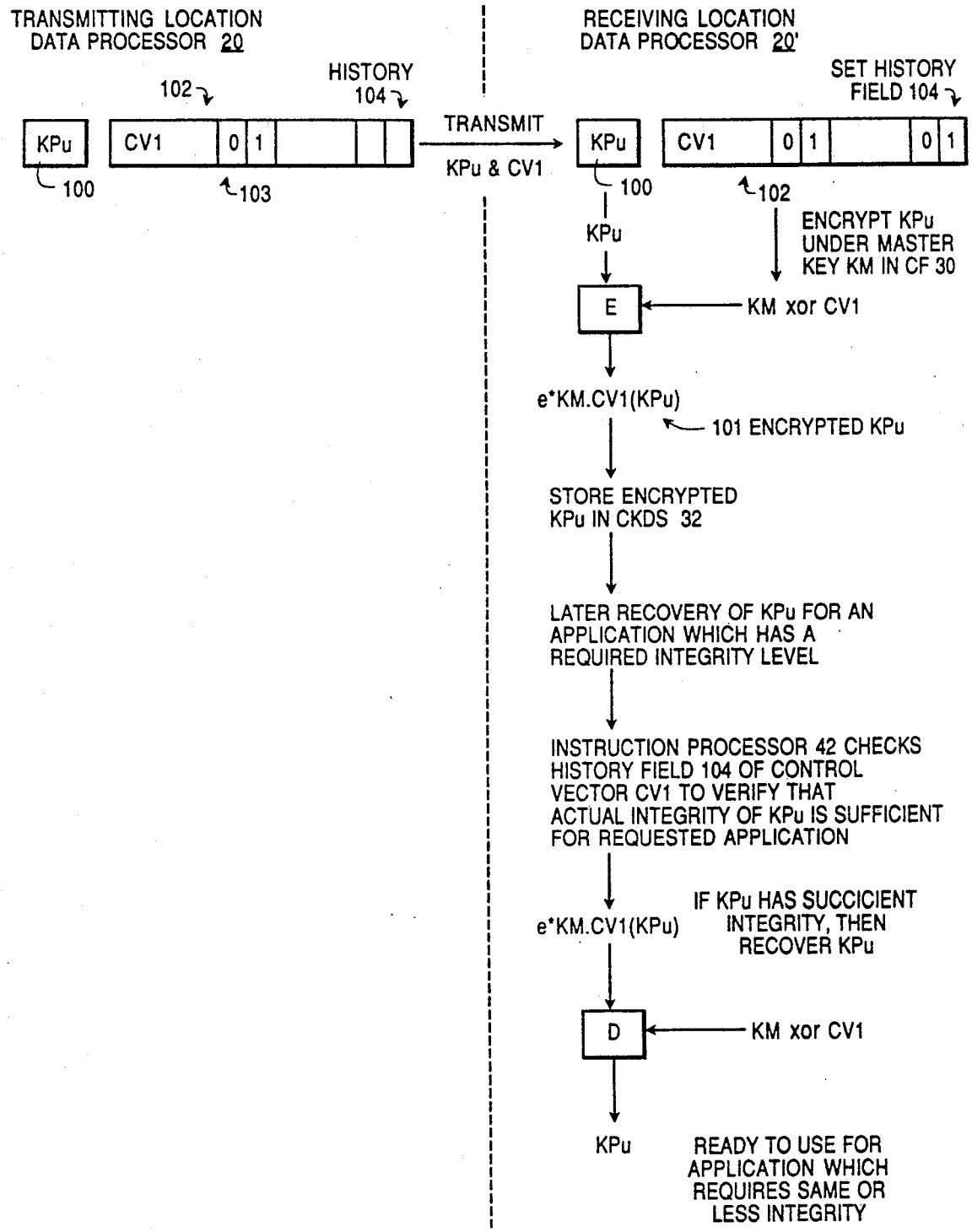
FIG. 5 is a data flow diagram illustrating an example of a low integrity transmission of a public key and its control vector.
Figure 6:
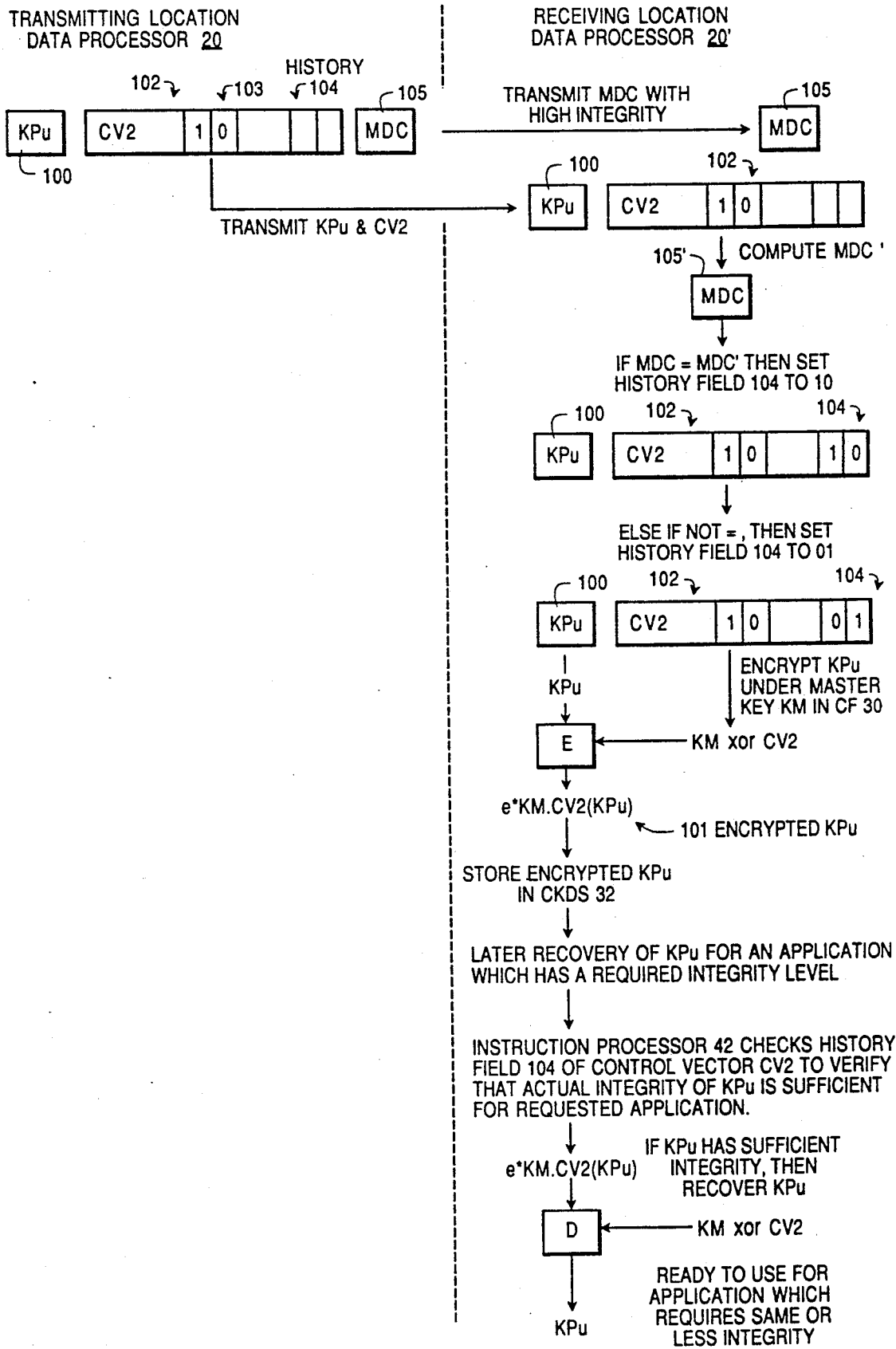
FIG. 6 is a data flow diagram illustrating an example of the intermediate integrity transmission of a public key and its control vector.
Figure 7:
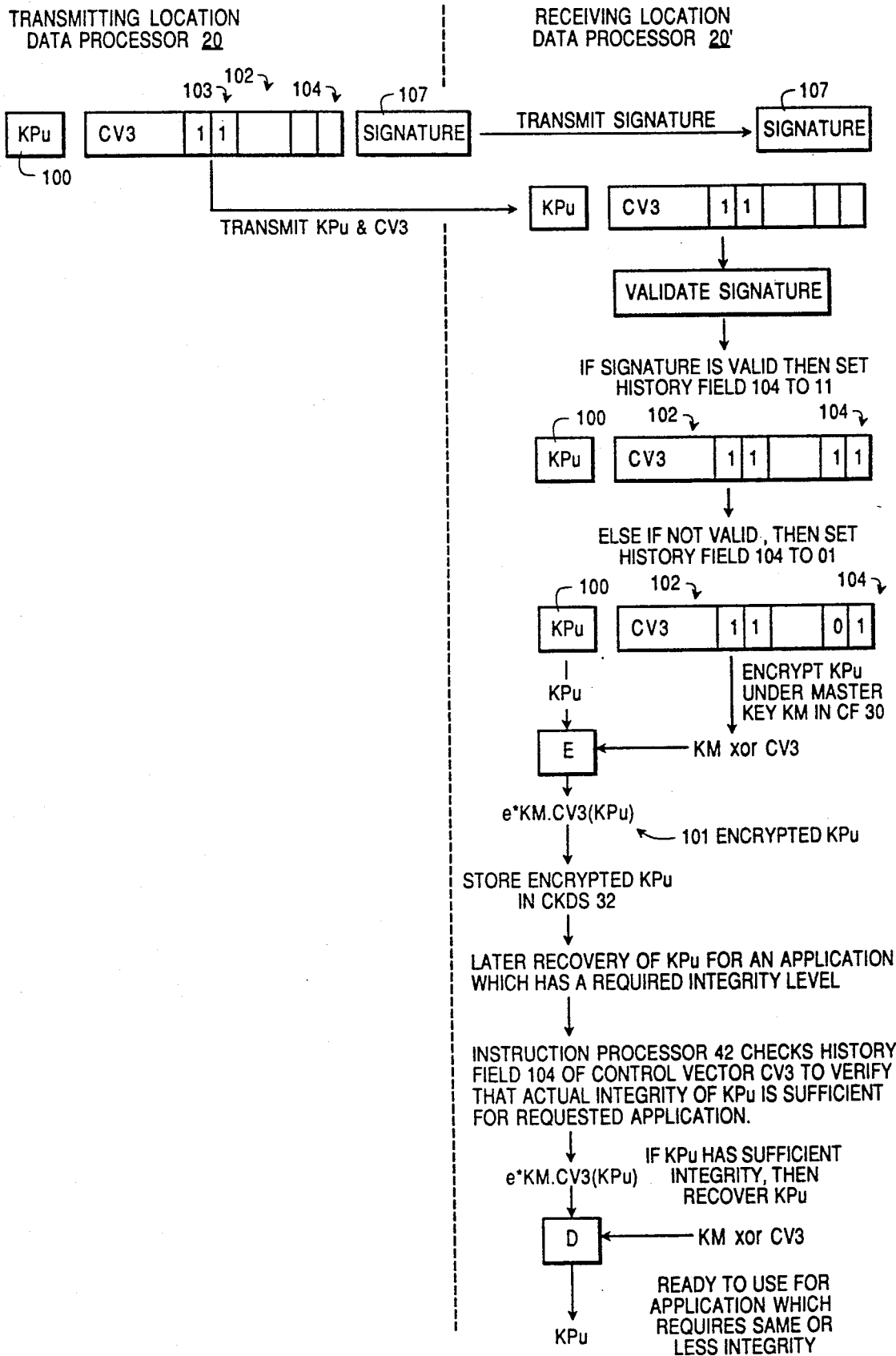
FIG. 7 is a data flow diagram illustrating an example of a high level integrity transmission of a public key and its control vector.

In accordance with the invention, instruction processor 42 in the cryptographic facility 30 is programmed by the cryptographic microinstructions and the CFAP access instructions to perform a number of key management functions such as are represented in the flow diagram of FIG. 4, to support the distribution of public keys within the cryptographic network. Instructions are provided to generate public key and private key pairs, to export a public key and to import a public key, all with appropriate generation and checking of control vectors so as to control the subsequent uses of the public key and the private key. In accordance with the invention, FIG. 5 shows the progress in the generation of a public key 100 and its corresponding control vector 102 at a first data processor 20 and the modification of the control vector 102 after transmission to a second data processor 20', based upon the actual level of import integrity which is determined at the second data processor 20'. FIG. 5 demonstrates this sequence for a relatively low level of integrity for the transmission of the key 100 and control vector 102. FIG. 6 demonstrates the sequence for an intermediate level of integrity for the transmission. FIG. 7 demonstrates the sequence for a relatively high level of integrity for the transmission.

FIG. 4 illustrates the flow diagram of the method to control the use of an exported public key based on its actual level of integrity, as imported at the receiving data processor. The method begins with step 400 wherein a public key KPu 100 and its corresponding private key KPr are generated as a pair in a first data processor 20. Then, in step 402, the private key KPr is stored in the first data processor 20. In step 404, the export of public key KPu 100 begins in the first data processor 20, to carry out the transmission of the public key KPu to the second data processor 20'.

Then step 406 selects the level of integrity for transmission of public key KPu 100 and its associated control vector to the second data processor 20'. In step 408, the selection of the level of integrity is shown as being either a high level, an intermediate level, or a low level of integrity for transmission.

In step 410, the first level, being a low level integrity, has been selected. The data flow diagram for this example is shown in FIG. 5. In step 412, a generation of first control vectors CV1 is performed with a blank history field 104. Optionally, the intended level of integrity can be written into control vector field 103, at the transmitting location. Then in step 414, the public key KPu and the first control vector CV1 are transmitted from the first data processor 20 to a second data processor 20' over the communications network 10, using the first level of integrity, which is the selected low level.

In step 416, the second data processor 20' then begins the step to import the public key KPu and its associated control vector CV1. In step 418, the public key KPu and its control vector CV1 are tested for the actual level of integrity as received at the second data processor 20'.

Then, in accordance with the invention, step 420 shows the writing of the actual level of integrity as received, into the history field 104 of the control vector CV1, at the second data processor 20'.

Then step 422 shows that all applications of the public key KPu are then limited to only those applications requiring a level of integrity which is not more than the actual level of integrity written into the history field 104 of the first control vector CV1.

Alternately, if the selection step 408 in FIG. 4 determines that an intermediate level of integrity is desired for the transmission of the public key KPu and its control vector, then the method transitions to step 424. The data flow diagram for this example is shown in FIG. 6. Then in step 426, a second control vector CV2 is generated at the sending or first data processor 20, with a blank history field 104. Then in step 428, the public key KPu and its second control vector CV2 are transmitted from the first data processor 20 to a second data processor 20' over the communications network 10, using the second level of integrity.

Then, at the second data processor 20', the step of importing the public key begins, as is shown in step 430. Then in step 432, the public key KPu and its control vector CV 2 are tested for the actual level of integrity as received at the second data processor 20'.

Then, in accordance with the invention, the actual level of integrity is written into the history field 104 of the second control vector CV2, at the second data processor, as is shown in step 434.

Thereafter, in step 436, all applications of the public key KPu are limited to only those applications requiring a level of integrity which is not more than the actual level of the history field of the second control vector CV2.

In the method illustrated in the flow diagram of FIG. 4, if the selection step 408 determines that a high level of integrity has been selected for the transmission of the public key and its control vector, then the flow diagram transitions to step 438. The data flow diagram for this example is shown in FIG. 7. The third control vector CV3 is generated at the first data processor 20, with a blank history field, as shown in step 440. Then, step 442 shows the transmission of the public key KPu and its third control vector CV3, from the first data processor 20 to the second data processor 20' over the communications network 10.

Then, step 444 shows the beginning of the import step for importing the public key at the second data processor 20'. The public key KPu and the control vector CV3 are then tested for the actual level of integrity as they have been received at the second data processor 20', as shown in step 446.

Then, in accordance with the invention, the actual level of integrity is written into the history field 104 of the control vector CV3, at the second data processor 20'.

Thereafter, step 450 shows that all applications of the public key KPu are limited to only those applications requiring a level of integrity which is not more than the actual level of integrity written into the history field 104 of the third control vector CV3.

FIG. 5 shows the data flow diagram for an example of the low integrity transmission shown in the method steps 410 through 422 of FIG. 4. In FIG. 5, the public key KPu 100 and the control vector CV1 102 are shown at the transmitting location, which is the data processor 20. The control vector 102 is shown having an intended integrity field 103 and an integrity history field 104. The intended integrity field 103 is optional, and has a binary value written into it at the sending location, the data processor 20, which represents the intended integrity for the transmission to the receiving location which will be the second data processor 20'. The levels of integrity are, in this example, represented by the binary value "01" for a low level of integrity, a binary value of "10" for an intermediate level of integrity, and a binary value of "11" for a high level of transmission integrity. The low integrity transmission which is intended for FIG. 5, has a value of "01" written into the control vector 102 in the intended integrity field 103. Then, the public key KPu 100 and the control vector CV1 102, are transmitted over the communications link 10 to the receiving location which is the data processor 20'.

At the receiving location, a test is performed on the received public key KPu 100 and the received control vector CV1 102, to determine the actual level of integrity, as received. The type of test can be determined by pre-arrangement between the sender and the receiver. In this example, the type of test can be based on the value in the intended integrity field 103. Alternate ways can be used by the sender to tell the receiver what type of import integrity test should be performed. It is also possible for the receiver to independently choose the form of test to apply. Further, the receiver may elect to apply no test for integrity, in which case the attribution of import integrity will be the lowest level. The test can be performed in a number of ways, for example by an examination of any modification detection code (MDC) or digital signature or combinations of an MDC integrity method and one or more digital signatures, which has been associated with the public key KPu and control vector CV1. In order to insure the desired level of integrity for both the key and the control vector, the MDC or the digital signature or combinations of the MDC and digital signature, are computed on the concatenated combination of both the key and the control vector. If a user defined field is concatenated with the key and the control vector, it can also be included in the MDC or signature computation.

In an alternate embodiment of the invention, the control vector 102 may be installed in the receiving location 20' by another means, such as by prior storage in the CFAP 34 or in the memory 46. The control vector 102 would then be accessed and its blank history field 104 would be written into, in accordance with the invention. In this alternate embodiment, the MDC or digital signature would be computed on the public key 100.

In the example of FIG. 5, the low level of integrity for the transmission has no corresponding MDC or digital signature. Since the test confirms that there is no additional data object such as an MDC or a digital signature, the level of integrity as received, is attributed in this example as a low level and will be assigned a binary value of "01." This binary value is written into the history field 104 of the control vector 102, as is shown in FIG. 5.

Then, at the receiving location which is the data processor 20', the public key KPu 100 will be stored in an encrypted form in a manner similar to that described in the above cited patents by S. M. Matyas, et al. In particular, the public key KPu 100 will be encrypted under the master key KM in the crypto facility 30. The control vector CV1 is exclusive OR'ed with the master key KM and is used as a key-type expression for the encryption of the key KPu 100, resulting in the encrypted form 101 of public key KPu 100 as represented by e*KM.CV1(KPu). This encrypted form 101 of the public key KPu 100 is then stored in the cryptographic key data set 32 (CKDS) in the receiving location data processor 20'.

Figure 8:
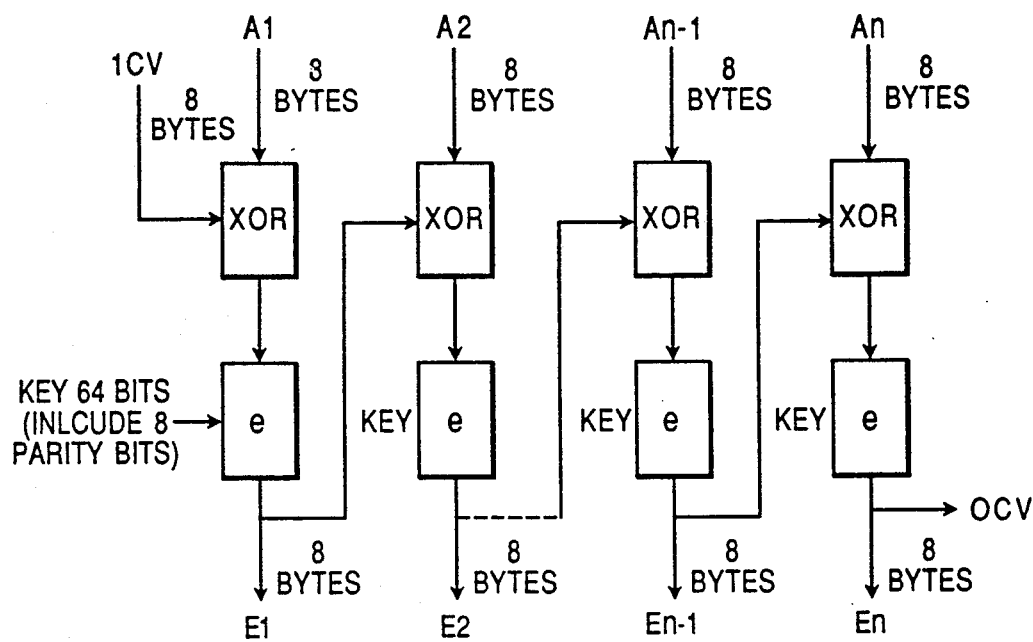
FIG. 8 is a data flow diagram of the cipher block chaining mode of encryption.
Figure 9:
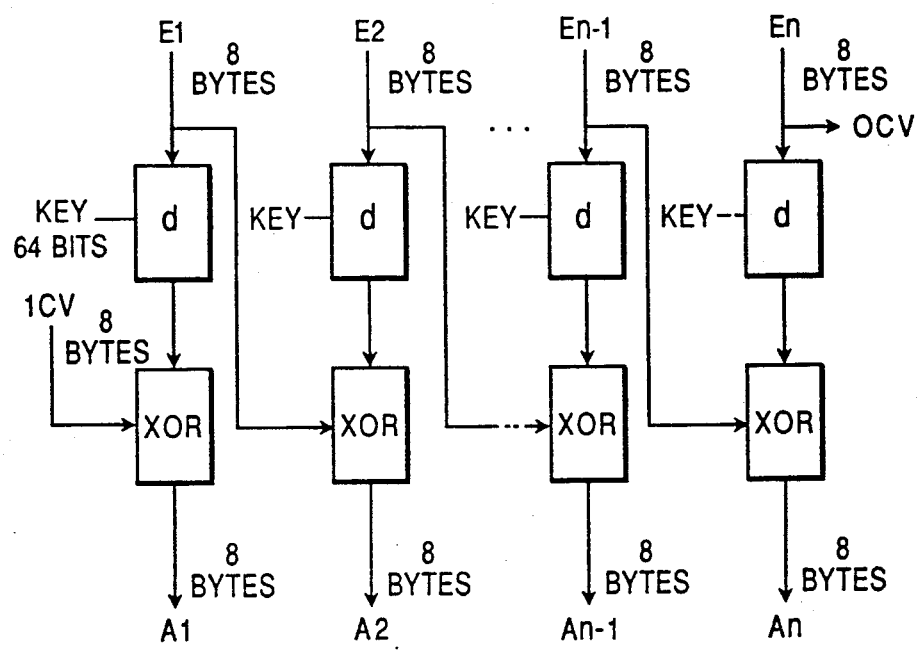
FIG. 9 is a data flow diagram of the cipher block chaining mode of decryption.

The public key KPu and the private key KPr are created by a public key generation algorithm which will generate key expressions which can be quite long. In order to accommodate the relatively long expressions for KPu and KPr, a 64-byte field is allocated for the key. If the public key generation algorithm generates a public key KPu which is shorter than 64 bytes, padding zeros will be inserted at the beginning or the end of KPu so that it will have a full complement of 64 bytes. Other lengths for the maximum length attributed to a public key KPu can also be chosen. The technique for encryption and decryption of the public KPu using the cryptographic architecture described in the above cited patents by S. M. Matyas, et al., uses a 64-bit wide operand and key expression. In order to accommodate a 64-byte public KPu expression, cipher block chaining (CBC) is used as the mode of encryption and decryption. The particular cipher block chaining mode of encryption and decryption is that specified in the ANSI Cryptographic Modes of Operation X3.106-1983. FIGS. 8 and 9 show the CBC mode of encryption and decryption. In FIG. 8 for CBC mode of encryption, KPu is a 64-byte-expression which is a concatenation of eight 64-bit consecutive portions A1, A2, A3 . . . A8. The key is the master key KM exclusive ORed with the control vector CV1. The initial chaining vector ICV is set equal to zero. As can be seen in FIG. 8 for the CBC mode of encryption, the ICV of zero is exclusive ORed with A1 resulting in A1 which is then applied as the operand input to the Data Encryption Algorithm block e, whose 64-bit key is the exclusive OR product of KM and CV1. As is provided in the above cited S. M. Matyas, et al. patents, KM is the left-half of a 128-bit long master key. The ciphertext expression E1 output from the encryption engine e is a 64-bit expression which is exclusive ORed with the next 64 bits of KPu, namely A2. The exclusive OR product is then applied as the operand to the encryption engine which uses the same key KM exclusive ORed with the control vector CV1. This operation then continues until all eight of the 64-bit portions of the 64-byte expression for KPu have been encrypted and result in eight 64-bit ciphertext expressions E1, E2, E3 . . . E8 which are the concatenated representation of the encrypted KPu 101. As was described in the above cited S. M. Matyas, et al. patents, a sequence of an encryption followed by a decryption followed by an encryption is performed to multiply encrypt the operand KPu. FIG. 9 shows the CBC mode of decryption, which operates in a manner similar to that described for the CBC mode of encryption in FIG. 8. Hereinafter, when encryption or decryption operations using control vectors are applied to the public key KPu, the cipher block chaining encryption and decryption processes, as described above, will be the modes for data encryption or decryption. As an additional option, use can be made of the extended control vector feature of U.S. Pat. No. 4,924,415 by S. M. Matyas, et al. cited above, in order to make use of extended control vectors CV1' which are longer than 64 bits or 128 bits.

As seen in FIG. 5, when the public key KPu is desired to be recovered from the CKDS 32 for use in an application which has a required integrity level, the encrypted form 101 is accessed from the CKDS 32 and delivered to the instruction processor 42 in the crypto facility 30. The corresponding control vector CV1 can be stored in the CKDS 32, in the CF environment memory 46, in the CFAP 34 or elsewhere. The instruction processor 42 checks the history field 104 of the control vector CV1 to verify that the actual integrity of KPu 100 is sufficient for the requested application. If KPu 100 is found to have a sufficient integrity level, then it may be recovered from its encrypted form 101 accessed from the CKDS 32. The recovery operation requires the exclusive OR of the master key KM and the control vector CV1 to form a key-type expression which is used in the decryption of the encrypted form 101 of the KPu, that is e*KM.CV1(KPu), which results in the decrypted form 100 of KPu, which is ready to use for any application which requires the same or less integrity. No other expression for the control vector CV1 102 will result in the successful recovery of the correct form of the public key KPu 100.

FIG. 6 illustrates the data flow diagram for an example of an intermediate of integrity in the transmission of the public key KPu 100 and its control vector CV2 from the first data processor 20 over the communications network 10 to the second data processor 20'. This corresponds to the steps 424 through 436 of the method of FIG. 4.

In FIG. 6, since the intended level of integrity for transmission is the intermediate level, its corresponding binary value of "10" is optionally written into the intended integrity field 103 of the control vector CV2 at the sending location, which is the data processor 20. In this example of an intermediate level of integrity for transmission, a modification detection code (MDC) is computed for the concatenated expression of the KPu 100 and the CV2 102. Computation of a modification detection code is described in greater detail in the Brachtl, et al. U.S. Pat. No. 4,908,861 cited above. The modification detection code may then be transmitted over a link with a high level of integrity to the receiving location which is the data processor 20'. This may be performed at the same time as is the transmission of the public key KPu 100 and the control vector CV2 102. Alternately, the MDC may have been previously computed and delivered by a high integrity link such as a courier to the receiving location 20' or in a smart card. In either event, the public key KPu 100 and its corresponding control vector CV2 102 is transmitted to the receiving location which is the data processor 20'.

At the receiving location, data processor 20', the modification detection code MDC' is computed on the concatenated expression of the public key KPu 100 and the control vector CV2 102, as they are received over the communications network 10. Then it is determined in the receiving location whether the MDC which was previously transmitted to the receiving location with high integrity, is equal to the MDC' which is computed from the value of KPu and CV2 just received. If they are equal, then the history field 104 is set to indicate the intermediate level of integrity which is a binary "10." Alternately, if the MDC is not equal to the MDC', then the history field 104 of the control vector 102 is set to indicate a low level of integrity or a binary "01."

Then, as can be seen in FIG. 6, the public key KPu 100 will be stored in the receiving location using the control vector CV2, in a manner similar to that described in the copending patent applications and patents by S. M. Matyas, et al., cited above. As is seen in FIG. 6, the public key KPu 100 is encrypted under the master key KM in the crypto facility 30. This is done by exclusive ORing master key KM with the control vector CV2 and using that product as a key-type expression in the encryption operation on the public key KPu, this resulting in the encrypted form 101 of KPu having the form e*KM.CV2(KPu). This encrypted form 101 of KPu is then stored in the cryptographic key data set 32 (CKDS) at the receiving location data processor 20'.

Later, when it is desired to recover KPu from its encrypted form 101 in order to use it in an application which has a required level of integrity, the encrypted form 101 of KPu is accessed from the cryptographic key data set 32. Then, the instruction processor 42 in the crypto facility 30 checks the history field 104 of the control vector CV2 to verify that the actual integrity of the public key KPu is sufficient for the requested application. If it is determined that its integrity is sufficient, then KPu may be recovered.

The recovery operation requires the exclusive ORing of the control vector CV2 with the master key KM, the product expression then being used as a key-type expression in the decryption operation for the encrypted form 101 of KPu which has been accessed from the CKDS 32. The result of the decryption operation gives the value of KPu 100, which is then ready for use in an application which requires the same or less integrity.

FIG. 7 illustrates the data flow diagram for an example of a high level of integrity transmission of the public key KPu and its corresponding control vector CV3. The high level of integrity is accomplished in this example by using a digital signature 107 such as a public key algorithm digital signature, as described for example in the *IEEE* article by Diffie and Hellman, cited above. The digital signature 107 is computed on the public key KPu 100 and the control vector CV3 in the transmitting location, which is the data processor 20. Then, the intended integrity field 103 optionally has a binary value "11" written into it corresponding to the high level of integrity intended for the transmission. Then, the KPu and CV3 are transmitted over the communications network 10 to the data processor 20', along with the digital signature 107.

The digital signature 107 can be formed by hashing the public key KPu and its control vector CV3 into a fixed length hashed expression which is then encrypted using a private key KPr owned by the transmitted location. If the private KPr is the corresponding key to public key KPu 100, then the signature 107 is called a self-signature. Alternately, if the private key used in forming the digital signature 107 is another private key KPr2, then the receiver at data processor 20' must already possess the corresponding public key KPu2. Since it is unlikely that anyone but the bonafide transmitter at data processor 20 would have both private keys KPr2 and KPr, this is a higher integrity level for transmission of KPu and CV3, than is the self-signature method.

At the receiving location, which is the data processor 20', the public key KPu and the control vector CV3 are then used to validate the digital signature 107. If the digital signature is valid, then the history field 104 in the control vector 102 is set to a value of "11" indicating the high level of integrity, as received. Alternately, if the digital signature 107 is not found to be valid, then the level of integrity is attributed as a low level of actual integrity, and the binary value of "01" is written into the history field 104 of the control vector 102. Then, the public key KPu is encrypted, as previously described, by encrypting it under the product of the master key KM exclusive ORed with CV3 in the crypto facility 30. Thereafter, the encrypted form 101 of KPu is stored in the CKDS 32.

Later, when KPu is desired to be recovered for use in an application which has a required level of integrity, the encrypted form 101 of KPu is accessed from the CKDS 32. Then, the instruction processor 42 checks the history field 104 of the control vector CV3 to verify that the actual integrity of KPu is sufficient for the requested application. If KPu has sufficient integrity, then KPu 100 is recovered from the encrypted form 101, as previously described. Thereafter, the recovered value of KPu 100 is ready to use for an application which requires the same or less integrity. In this manner, a method is provided for controlling the use of a public key, based on the level of import integrity for that public key.

FIG. 10 is a data flow diagram illustrating the property of the propagation of the history field from a first control vector for a first public key received at the receiving station into a second control vector for a second public key whose integrity has been validated based upon the integrity of the first public key. In FIG. 10, at the receiving location data processor 20', the beginning status is that which is found at the end of FIG. 6 where the first public key KPu1, 100 and its corresponding control vector CVPu1, 102 are stored. CVPu1 102 has a history field 104 with an integrity value of "10" which indicates the level of import integrity which is attributed to KPu1 100 as it was imported into the receiving location data processor 20'. Now, in accordance with good security practice, a substitute public KPu2 is desired to be transmitted from the transmitting location data processor 20 to the receiving location data processor 20'. The problem will be to transmit KPu2 to the receiving data processor 20' with an acceptable level of integrity. That problem is solved as follows. At the transmitting location data processor 20, the second public key KPu2 200 and its corresponding control vector CVPu2 202 are prepared for transmission to the receiving location. At the transmitting location 20, the concatenated combination of KPu2 200 and CVPu2 202 with the blank history field 204, are hashed into a 128-bit hash expression 210. The 128-bit length is merely used in this example and other lengths could be used. Then, the hash expression 210 is operated upon by a public key digital signature operation. In accordance with standard public key algorithm practice, the private key KPr1 which corresponds to the public key KPu1, is used to "decrypt" the hash expression 210, resulting in the digital signature 220. Then, the digital signature 220 and the public key KPu2 200 and its corresponding control vector CVPu2 202 are transmitted over the communications link from the transmitting location data processor 20 to the receiving location data processor 20'.

At the receiving location data processor 20', the concatenated combination of the public key KPu2 200 and the control vector CVPu2 202 with its blank history field 204, are hashed to form a 128-bit hash expression 210'. Then, the signature 220 is "encrypted" with the first public key KPu1, resulting in the recovery of the hash expression 210. If the hash expression 210 recovered in the data processor 20' equals the hash expression 210', then the digital signature is verified and the receiving location is assured that the owner of the first private key KPr1 transmitted the second public key KPu2 200 and its corresponding control vector CVPu2 202. Since the first public key KPu1 100 is used in a chain to establish the import integrity for the second public key KPu2, the level of integrity in the history field 104 for the first control vector CVPu1 102, namely the binary expression "10," is now copied into the history field 204 of the second control vector CVPu2 202 for the second public key KPu2 200. In this manner, the level of integrity is propagated from the first public key 100 to the second public key 200 and is memorialized in the history field 204.

The second public key KPu2 200 and its control vector CVPu2 202 are then stored in their encrypted form at the receiving location data processor 20', in a manner similar to that described above for the examples in FIGS. 5, 6 and 7. In this manner, the level of integrity for subsequently received public keys can be propagated for public keys which are so chained. Each subsequent public key received over the communications link is validated by the chain of previously received public keys and their corresponding levels of import integrity are propagated in that chaining operation.

Although a specific embodiment of the invention has been disclosed, it will be understood by those having skill in the art that changes can be made to the specific embodiment without departing from the spirit and the scope of the invention.

What is claimed is:

1. In a public key cryptographic system including a pair of cryptographic devices communicating using a public key algorithm, a method for limiting the use of a public key to applications not requiring a level of integrity greater than a received level of integrity for the public key, comprising the steps of:

generating a public key and private key as a pair;
storing said public key at a first device in said system;
storing at said first device a control vector associated with said public key, having a first field;
transmitting from said first device, over a communications link to a second cryptographic device, said public key and said control vector, using a selected one of a plurality of levels of integrity for the transmission;
testing at said second device said public key and said control vector to determine a received level of integrity thereof, as it is received at said second device;
writing at said second device a value into said first field of said control vector characterizing said received level of integrity; and
limiting cryptographic applications for said public key, to said received level of integrity characterized by said first field in said control vector.

2. The method of claim 1, which further comprises the steps of:
communicating from said first device to said second device, information defining said selected one level of integrity;
receiving at said second device said public key, said control vector and said information defining said selected level of integrity; and
controlling said testing step with said information defining said selected level of integrity.

3. The method of claim 2, which further comprises:
writing said information defining said selected level of integrity in a second field of said control vector prior to said transmitting step.

4. The method of claim 1, wherein said testing step uses s modification detection code.

5. The method of claim 1, wherein said testing step uses a public key digital signature.

6. The method of claim 5, wherein said digital signature is formed using said private key from said pair.

7. The method of claim 5, wherein said digital signature is formed using a private key which is not a member of said pair.

8. The method of claim 1, wherein said step of limiting cryptographic applications includes the steps of:
encrypting said public key under a key expression which is the exclusive OR product of a master key and said control vector, forming an encrypted form of said public key;
receiving a request to perform a cryptographic application with said public key, characterized by a required level of integrity;
checking said first field of said control vector and determining that said required level of integrity is not greater than said received level of integrity;
decrypting said encrypted form of said public key under said key expression;
performing said cryptographic application with said public key.

9. The method of claim 8 wherein said step of encrypting said public key includes the step of cipher block chaining encryption; and
said step of decrypting said encrypted form of said public key includes the step of cipher block chaining decryption.

10. The method of claim 1, which further comprises the steps of:
storing a second public key at said first device in said system;

storing a second control vector at said first device in said system, associated with said second public key, having a second field;
computing a digital signature on said second public key and said second control vector, using said private key of said pair;
transmitting from said first device, over said communications link to said second cryptographic device, said second public key, said second control vector and said digital signature;
testing at said second device said second public key said second control vector and said digital signature, using first said public key;
copying said value in said first field of said first said control vector into said second field of said second control vector;
whereby the level of integrity characterizing said first said public key is attributed to said second public key.

11. In a public key cryptographic system including a pair of cryptographic devices communicating using a public key algorithm, an apparatus for limiting the use of a public key to applications not requiring a level of integrity greater than a received level of integrity for the public key, comprising:
first means for generating a public key and private key as a pair;
second means coupled to said first means, for storing said public key at a first device in said system;
third means coupled to said second means, for storing at said first device a control vector associated with said public key, having a first field;
fourth means coupled to said second and third means, for transmitting from said first device, over a communications link to a second cryptographic device, said public key and said control vector, using a selected one of a plurality of levels of integrity for the transmission;
fifth means coupled to said communications link, for testing at said second device said public key and said control vector to determine a received level of integrity thereof;
sixth means coupled to said fifth means, for writing at said second device a value into said first field of said control vector characterizing said received level of integrity; and
seventh means coupled to said sixth means, for limiting cryptographic applications for said public key, to said received level of integrity characterized by said first field in said control vector.

12. The apparatus of claim 11, wherein said seventh means for limiting further includes:
control vector checking means for checking said first field to determine that a level of integrity required for a cryptographic application is not greater than said received level of integrity.

13. In a data processing network including a pair of communicating cryptographic devices, a method for limiting the use of a communicated key to applications not requiring a level of integrity greater than a received level of integrity for the key, comprising the steps of:
storing a key in a first cryptographic device in said network;
storing at said first device a control vector associated with said key, having a first field;
transmitting from said first device, over a communications link to a second cryptographic device in said network, said key and said control vector, using a selected one of a plurality of levels of integrity for the transmission;

testing at said second device said key and said control vector to determine a received level of integrity thereof;

writing at said second device a value into said first field of said control vector characterizing said received level of integrity; and limiting cryptographic applications for said key, to said received level of integrity characterized by said first field in said control vector.

14. The method of claim 13, which further comprises the steps of:

communicating from said first device to said second device, information defining said selected one level of integrity;

receiving at said second device said key, said control vector and said information defining said selected level of integrity; and controlling said testing step with said information defining said selected level of integrity.

15. In a data processing network including a pair of communicating cryptographic devices, a method for limiting the use of a communicated key to applications not requiring a level of integrity greater than a received level of integrity for the key, comprising the steps of:

storing a key at a first cryptographic device in said network;

storing at said first device a control vector associated with said key, having a first field;

transmitting from said first device, over a communications link to a second cryptographic device in said network, said key and said control vector, using a selected one of a plurality of levels of integrity for the transmission;

testing at said second device said key and said control vector to determine a received level of integrity thereof;

writing at said second device a value into said first field of said control vector characterizing said received level of integrity;

encrypting at said second device said key under a key expression which is the exclusive OR product of a master key and said control vector, forming an encrypted form of said key;

receiving at said second device a request to perform a cryptographic application with said key, characterized by a required level of integrity;

checking at said second device said first field of said control vector and determining that said required level of integrity is not greater than said received level of integrity;

decrypting at said second device said encrypted form of said key under said key expression if said required level of integrity is not greater than said received level of integrity; and performing at said second device said cryptographic application with said key.

16. The method of claim 15, which further comprises the steps of:

communicating from said first device to said second device, information defining said selected one level of integrity;

receiving at said second device said key, said control vector and said information defining said selected level of integrity; and controlling said testing step with said information defining said selected level of integrity.

17. The method of claim 16, which further comprises:

writing said information defining said selected level of integrity in a second field of said control vector prior to said transmitting step.

18. The method of claim 15, wherein said testing step uses a modification detection code.

19. The method of claim 15, wherein said testing step uses a public key digital signature.

20. The method of claim 15, wherein said key is a public key which is a member of a pair consisting of said public key and a private key.

21. The method of claim 20, wherein said testing step uses a public key digital signature.

22. The method of claim 21, wherein said digital signature is formed using said private key from said pair.

23. The method of claim 21, wherein said digital signature is formed using a private key which is not a member of said pair.

24. In a data processing network including a pair of cryptographic devices communicating using a public key algorithm, a method for limiting the use of a public key to applications not requiring a level of integrity greater than a received level of integrity for the public key, comprising the steps of:

storing a first public key and a first private key as a pair at a first device in said network;

storing a first control vector associated with said first public key, having a first field, at said first device;

storing a second public key and a second control vector associated with said second public key, having a second field, at said first device;

transmitting from said first device, over a communications link to a second cryptographic device in said network, said first public key and said first control vector, using a selected one of a plurality of levels of integrity for the transmission;

testing at said second device, said first public key and said first control vector to determine a received level of integrity thereof;

writing a value into said first field of said first control vector characterizing said received level of integrity, at said second device;

forming a digital signature characterizing said second public key and said second control vector, using said first private key at said first device;

transmitting from said first device to said second device, said second public key, said second control vector and said digital signature;

testing at said second device said second public key, said second control vector and said digital signature using said first public key;

copying said value in said first field of said first control vector into said second field of said second control vector, characterizing said received level of integrity of said first public key;

whereby said received level of integrity of said first public key is attributed as the level of integrity for said second public key.

25. The method of claim 24, which further comprises the step of:

limiting cryptographic applications for said second public key, to said received level of integrity characterized by said second field in said second control vector.

26. The method of claim 25, wherein said step of limiting cryptographic applications includes the steps of:

encrypting said second public key under a key expression which is the exclusive OR product of a master key and said second control vector, forming an encrypted form of said second public key;

receiving a request to perform a cryptographic application with said second public key, characterized by a required level of integrity;

checking said second field of said second control vector and determining that said required level of integrity is not greater than said received level of integrity;

decrypting said encrypted form of said second public key under said key expression; performing said cryptographic application with said second public key.

27. In a data processing network including a pair of communicating cryptographic devices, a method for limiting the use of a communicated key to applications requiring a level of integrity greater than a received level of integrity for the key, comprising the steps of:

storing a key and a control vector associated with said key, having a first field, in a first cryptographic device in said network;

transmitting from said first device, over a communications link to a second cryptographic device in said network, said key and said control vector, using a selected one of a plurality of levels of integrity for the transmission;

testing at said second device said key to determine a received level of integrity thereof;

writing at said second device a value into said first field of said control vector characterizing said received level of integrity; and limiting cryptographic applications for said key, to said received level of integrity characterized by said first field in said control vector.

28. In a data processing network including a pair of cryptographic devices communicating using a public key algorithm, a method for limiting the use of a public key to applications not requiring a level of integrity greater than a received level of integrity for the public key, comprising the steps of:

storing a first public key and a first private key as a pair at a first device in said network;

storing a second public key at said first device;

transmitting from said first device, over a communications link to a second cryptographic device in said network, said first public key, using a selected one of a plurality of levels of integrity for the transmission;

testing at said second device, said first public key to determine a received level of integrity thereof;

storing a first control vector associated with said first public key, having a first field, at said second device;

writing a value into said first field of said first control vector characterizing said received level of integrity, at said second device;

forming a digital signature characterizing said second public key, using said first private key at said first device;

transmitting from said first device to said second device, said second public key and said digital signature;

testing at said second device said second public key and said digital signature using said first public key;

storing a second control vector associated with said second public key, having a second field, at said second device;

copying said value in said first field of said first control vector into said second field of said second control vector, characterizing said received level of integrity of said first public key;

whereby said received level of integrity of said first public key is attributed as the level of integrity for said second public key.

29. The method of claim 28, which further comprises the step of:

limiting cryptographic applications for said second public key, to said received level of integrity characterized by said second field in said second control vector.

30. The method of claim 29, wherein said step of limiting cryptographic applications includes the steps of:

encrypting said second public key under a key expression which is the exclusive OR product of a master key and said second control vector, forming an encrypted form of said second public key;

receiving a request to perform a cryptographic application with said second public key, characterized by a required level of integrity;

checking said second field of said second control vector and determining that said required level of integrity is not greater than said received level of integrity;

decrypting said encrypted form of said second public key under said key expression;

performing said cryptographic application with said second public key.

* * * * *